United States Patent [19]

Scott

[11] 4,136,307
[45] Jan. 23, 1979

[54] AMPLIFIER ARRANGEMENT FOR PROCESS CONTROLLER

[75] Inventor: Brian J. Scott, Saffron Walden, United Kingdom

[73] Assignee: International Standard Electric Corporation, New York, N.Y.

[21] Appl. No.: 816,615

[22] Filed: Jul. 18, 1977

[51] Int. Cl.² .............................................. G05I 1/00
[52] U.S. Cl. .................................. 318/677; 318/679; 330/1 A
[58] Field of Search ............... 318/677, 571, 679, 681; 330/1 A, 124 R

[56] References Cited

U.S. PATENT DOCUMENTS

| 3,500,153 | 3/1970 | Werner, Jr. ...................... 318/679 X |
| 3,639,824 | 2/1972 | Malavasi ........................... 318/681 X |
| 3,851,259 | 11/1974 | Porawski ......................... 330/1 A X |
| 4,078,198 | 3/1978 | Murakosi et al. .................... 318/627 |

Primary Examiner—B. Dobeck
Attorney, Agent, or Firm—John T. O'Halloran; Peter C. Van Der Sluys

[57] ABSTRACT

A process controller for diameter control in drawing optical fibre preforms consists essentially of the parallel arrangement of two output amplifiers, one providing low gain at low ± input voltages, while the other has high gain at high ± input voltages and effectively zero gain at low ± input voltages.

4 Claims, 2 Drawing Figures

AMPLIFIER ARRANGEMENT FOR PROCESS CONTROLLER

BACKGROUND OF THE INVENTION

This invention relates to process controllers, and is particularly applicable to process controllers for use in diameter control of filaments, such as for instance in the production of glass optical fibre from preform, or of plastics coated wire or optical fibre.

In a drawing down process, such as the production of glass optical fibre from optical fibre preform, uniformity of diameter of the drawn fibre is provided by monitoring its diameter to provide a control signal which is fed to a process controller which controls a servo-motor that either regulates the rate of the feed of the preform into a drawing zone or regulates the rate of take-up of the drawn filament from the drawing zone. In the case of optical fibre it is generally preferred to have the servo-motor regulating the take-up speed. In the corresponding case of the production of a plastics coated optical fibre or wire, the diameter of the plastics coated fibre or wire is monitored, and the process controller controls a servo-motor that either regulates the feed of plastics material through an extruder, or regulates the line speed of the fibre or wire through the extruder.

One way of measuring the diameter of a filament, such as a bare optical fibre or a plastics coated fibre or wire, is to measure the optical attenuation it produces in a beam of light that is partially intercepted by the filament. Normally this measurement is made by a comparison technique in which a beam splitter is used to divide a light beam into two components, one of which is partially obstructed by the filament, while the other passes through an attenuator whose optical attenuation is adjustable.

The intensities of the two beams are then compared by chopping them and feeding them both to the same photodetector to provide a difference signal whose amplitude is approximately linearly proportional to the deviation of the filament diameter from a predetermined reference value set by the adjustable optical attenuator. This difference signal is rectified and fed to a process controller which provides an output for controlling the speed of the servo-motor.

For certain applications in wire production, it has been found satisfactory to use a type of process controller which operates by sampling the analog signal from the diameter sensing unit, and using this to increment (or decrement as appropriate) a motorized potentiometer that controls the servo-motor speed. The increment size remains constant after being preset, but the sampling repetition rate is a function of the magnitude of the deviation signal. To set up such an apparatus it is necessary to adjust the increment magnitude to a value small enough for a single increment not to produce too large a shift. However, although a reduction in the size of an increment tightens the control on the size, it also has the effect of slowing down the response of the system to perturbations. In many wire production applications, the perturbations are small enough, having regard to the effects they produce, for a relatively slow response to be acceptable. However, we have found that in the drawing of glass optical fibre from fibre preform, the drawing conditions are so sensitive to small changes that a process controller that was satisfactory for diameter control in wire production gave inadequate diameter control for glass fibre drawing. Thus for instance it was found that in drawing 100 micron diameter fibre from 6mm preform it was possible to hold the fibre diameter to about ± 3 microns over a region in which the preform diameter was substantially uniform, but, in drawing from a region where the diameter of the preform rose and fell by 5.7% over a distance of about 1½cm, the fibre diameter fluctuated in an oscillatory manner by about ± 25%. Clearly, a tighter control and a faster non-oscillatory response is desirable.

SUMMARY OF THE INVENTION

According to the present invention, there is provided a process controller having a transfer characteristic that is symmetrical about the origin and has a central plateau region bounded at each end by regions in which the gradient of the transfer characteristic is substantially increased, which transfer characteristic is provided by the parallel arrangement of first and second shaping amplifiers, wherein the first of said shaping amplifiers has a relatively low gain providing substantially all the gain in the central plateau region of the characteristic, which gain is adjustable, and wherein the second of said amplifiers is effectively switched off within the central plateau region of the transfer characteristic, and has a relatively high adjustable gain outside that region, the switching threshold being determined by adjustable potential dividers.

DESCRIPTION OF THE PREFERRED EMBODIMENT

Figure 1:
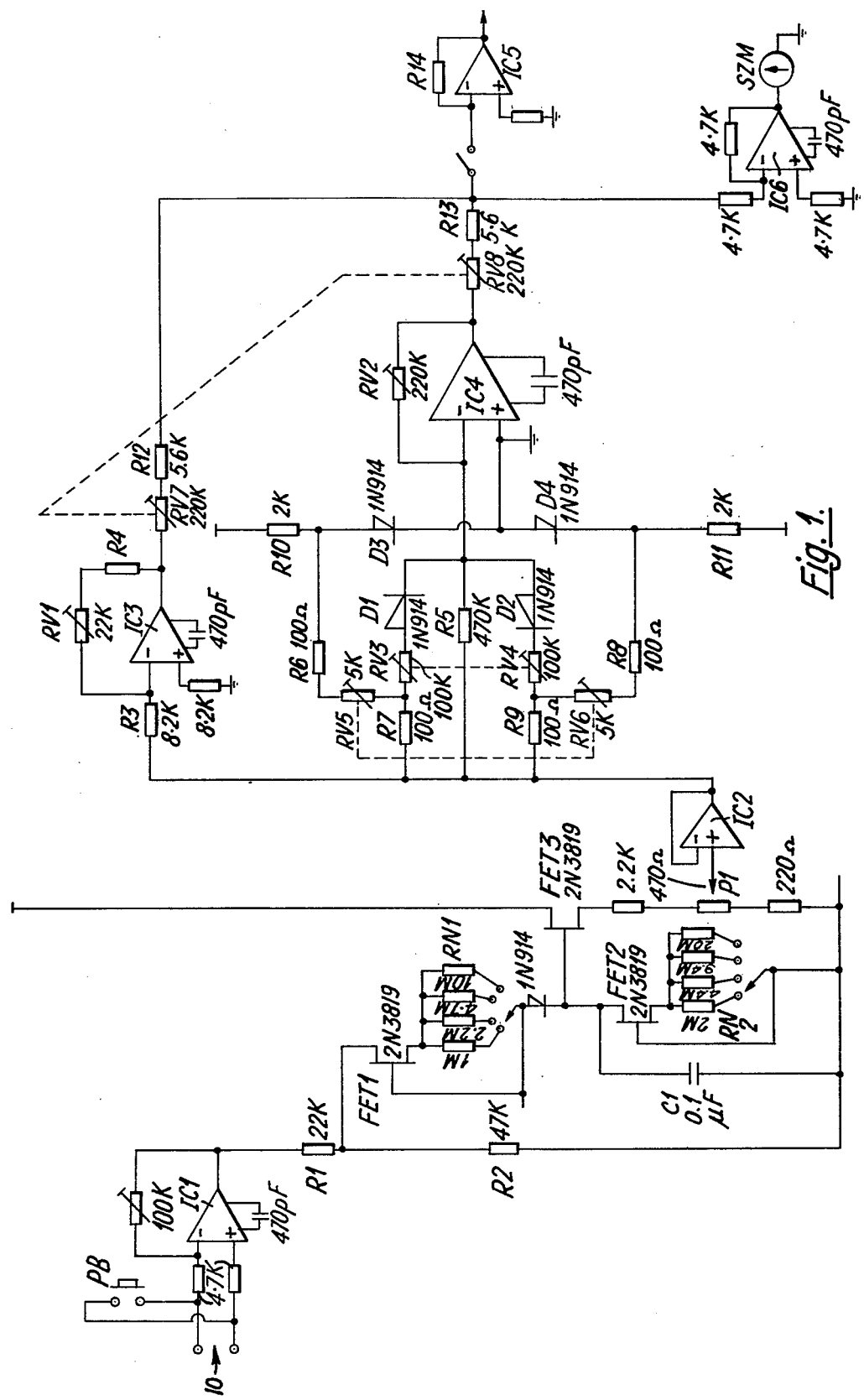
FIG. 1 is a circuit diagram of the process controller of this invention.
Figure 2:
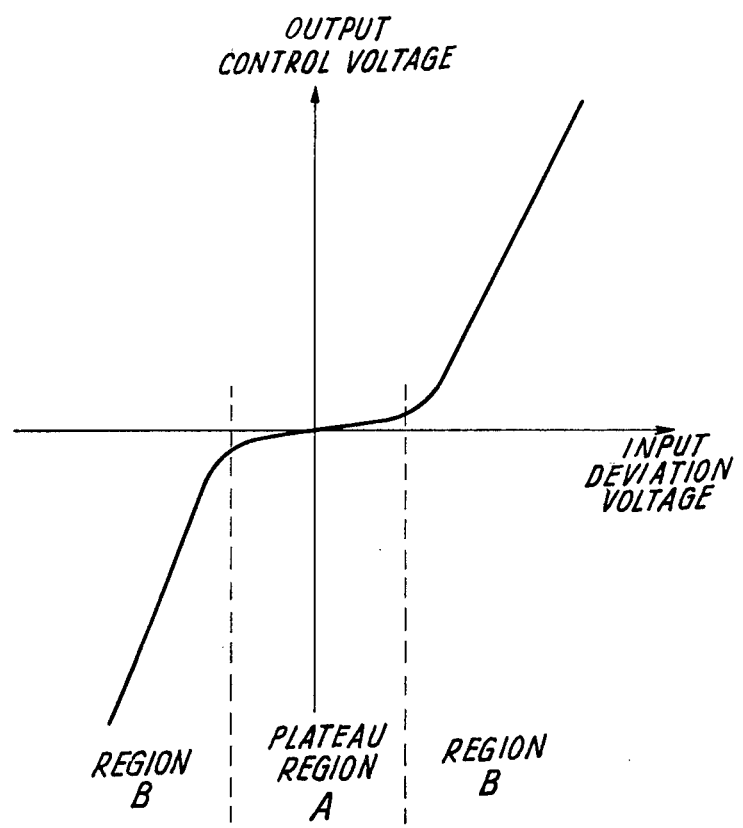
FIG. 2 is a graphic representation of the transfer characteristics of the process controller of FIG. 1.

The process controller of FIG. 1 has an input 10, which, for the purposes of fibre pulling diameter control, is connected to the output of a double beam diameter sensing unit (not shown) of the type described above. This particular diameter sensing unit is constructed so that its output is centered at about a 10 volts d.c. level. Hence, to center this signal around earth potential, it is amplified and level shifted by IC1 and its associated potential divider formed by R1 and R2. Next the signal is fed through a time constant circuit provided by capacitor C1, field effect transistors FET1, and FET2 and their associated resistor networks RN1 and RN2. (This time constant circuit could alternatively have been located at the input end of the process controller or within the diameter sensing unit). The signal is next source followed, using a field effect transistor FET3 and a buffer amplifier IC2, before being applied to the parallel combination of two shaping amplifier circuits whose gain is provided respectively by operational amplifiers IC3 and IC4. These two operational amplifiers provide the process controller with the transfer characteristic depicted in FIG. 2.

The transfer characteristic is symmetrical about the origin, and consists of a central plateau region A, in which the gradient is relatively small, this region being bounded at each end by regions B in which the gradient is substantially greater.

The plateau region A is provided by the relatively low valued gain of the amplifier circuit associated with operational amplifier IC3. This gain is determined by the resistance values of a variable resistor RV1, and resistors R3 and R4.

At high positive or negative input signal levels the gain of the amplifier circuit associated with operational amplifier IC4 is determined primarily by the resistance values of variable resistors RV2, RV3 and RV4. These are set to provide a gain that is large compared with that of the amplifier circuit associated with IC3. At low positive or negative input signal levels the forward bias across diodes D1 or D2 eventually drops beneath the forward bias conductance threshold. At this stage, the high valued gain is removed from this circuit, and instead gain is determined by the resistance values of RV2 and a resistor R5. The value of this resistor R5 is chosen to produce a fractional gain value that is small compared with the gain of the amplifier associated with IC3.

The value of the positive or negative input signal level at which the transition between high and low gain occurs is determined by two potential dividers formed by resistors R6 and R7 in combination with variable resistor RV5 in the case of positive signals, and by resistors R8 and R9 in combination with variable resistor RV6 in the case of negative signals. If the fixed potential ends of these potential dividers were held at earth potential, there would be a finite lower limit to the width of the plateau region. This may be wider than desired. Accordingly, the fixed potential ends of the potential dividers are instead tied to small positive and negative potentials, respectively, these being provided by a third potential divider formed by resistors R10 and R11, and diodes D3 and D4.

The slope of the part of the transfer characteristic lying within the plateau region A is controlled by RV1. The width of the plateau A is controlled by RV5 and RV6 which are ganged to maintain symmetry of the characteristic about the origin. The slope of the characteristic in the regions B is controlled by RV3 and RV4 which are ganged for the same reason. Adjustment of RV2 will also have the effect of altering the slope in regions B.

If desired, one or more additional pairs of diodes (not shown), and associated potential dividers (not shown) can be arranged in the input to IC4, in a manner similar to diodes D1 and D2 and their potential dividers, in order to steepen still further the slope of the characteristic in the regions B. The potential dividers would be arranged to make their associated pairs to diodes reach their forward bias conductance thresholds at different input signal levels.

The outputs of the two operational amplifiers IC3 and IC4 are summed in a further operational amplifier IC5 which may be an operational amplifier already included as part of the circuitry of the servo control motor (not shown) that drives the take-up reel (not shown) drawing the optical fibre (not shown) from the fibre drawing furnace (not shown).

The gain of this operational amplifier, and hence the servo-motor sensitivity, is determined by the resistance values of resistors R12, R13, and R14 together with variable resistors RV7 and RV8. RV7 and RV8 are ganged so that adjustment of the servo-motor gain does not upset the proportionality of the sum.

A further operational amplifier IC6 is provided, together with a set zero meter SZM and a test zero push-button PB, to enable the process controller to be zeroed. Depression of the push-button establishes a short circuit across the input to IC1, and while this is maintained a potentiometer P1 is adjusted to provide a zero reading on the meter SZM.

With appropriate settings of the variable resistors of the process controller of the above-described optical fibre drawing apparatus, it has been found possible in drawing a 100 micron silica glass optical fibre from 6mm preform to hold the fibre diameter to about $\pm \frac{1}{2}$ a micron over a region in which the preform diameter is substantially uniform. In drawing from a region where the diameter of the preform rose and fell by 5.7% over a distance of about $1\frac{1}{2}$ cm the fibre diameter was found to be held to within $\pm$ 2 microns with no apparent hunting.

It is to be understood that the foregoing description of specific examples of this invention is made by way of example only and is not to be considered as a limitation on its scope.

I claim:

1. A process controller having a transfer characteristic that is symmetrical about the origin and a central plateau region bounded at each end by regions in which the gradient of the transfer characteristic is substantially increased, said transfer characteristic being provided by:

a parallel arrangement of first and second shaping amplifiers, wherein the first of said shaping amplifiers has a relatively low gain providing substantially all the gain in the central plateau region of the characteristic, said gain being adjustable, and wherein the second of said amplifiers is effectively switched off within the central plateau region of the transfer characteristic and has a relatively high adjustable gain outside that region, the switching threshold being determined by adjustable potential dividers.

2. A process controller as claimed in claim 1, wherein the switching thresholds at the ends of the plateau region of the transfer characteristic are provided by the forward bias conductance thresholds of a pair of diodes.

3. A process controller having a transfer characteristic that is symmetrical about the origin and a central plateau region bounded at each end by regions in which the gradient of the transfer characteristic is substantially increased, said transfer characteristic being provided by:

a parallel arrangement of first and second shaping amplifiers, wherein the first of said shaping amplifiers has a relatively low gain for providing a significant portion of the gain in the central plateau region of the characteristic, said gain being adjustable, and wherein the second of said amplifiers has a gain greater than zero and less than one within the central plateau region of the transfer characteristic and switches to a relatively high adjustable gain outside said central plateau region, the switching threshold being determined by adjustable potential dividers.

4. A process controller as described in claim 3, additionally comprising a summing amplifier having an input connnected to the output of the first and second shaping amplifiers for receiving the outputs thereof and providing an output corresponding to the sum of the outputs of the first and second shaping amplifiers.

* * * * *